J. H. HENDERSON.
WAVE MOTOR.
APPLICATION FILED JAN. 6, 1914.
1,126,999.
Patented Feb. 2, 1915.
2 SHEETS—SHEET 1.
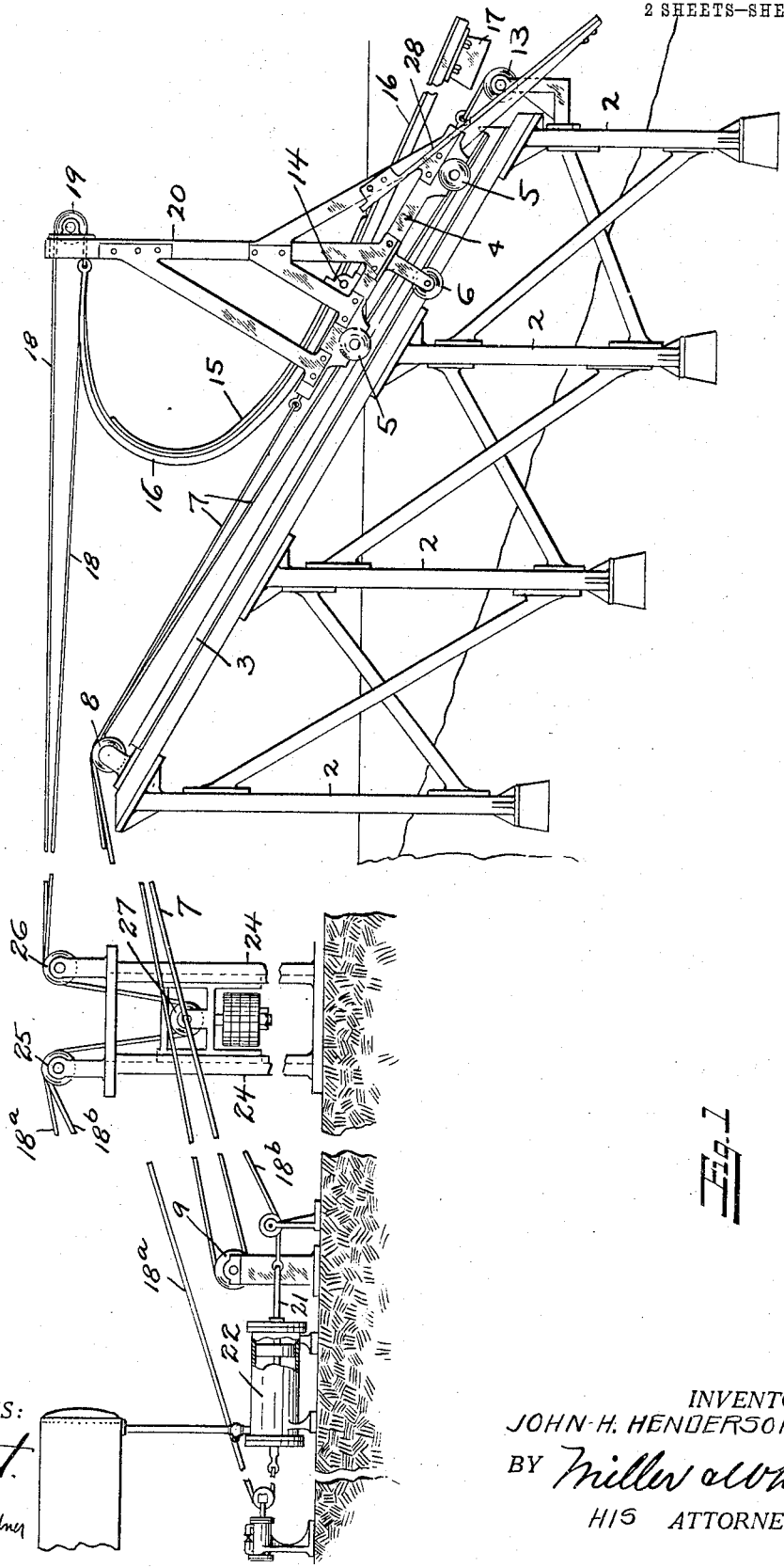
WITNESSES:
H. G. Prost.
J. B. Gardner
INVENTOR.
JOHN H. HENDERSON
BY Miller & White
HIS ATTORNEYS.

J. H. HENDERSON.
WAVE MOTOR.
APPLICATION FILED JAN. 6, 1914.
1,126,999.
Patented Feb. 2, 1915.
2 SHEETS—SHEET 2.
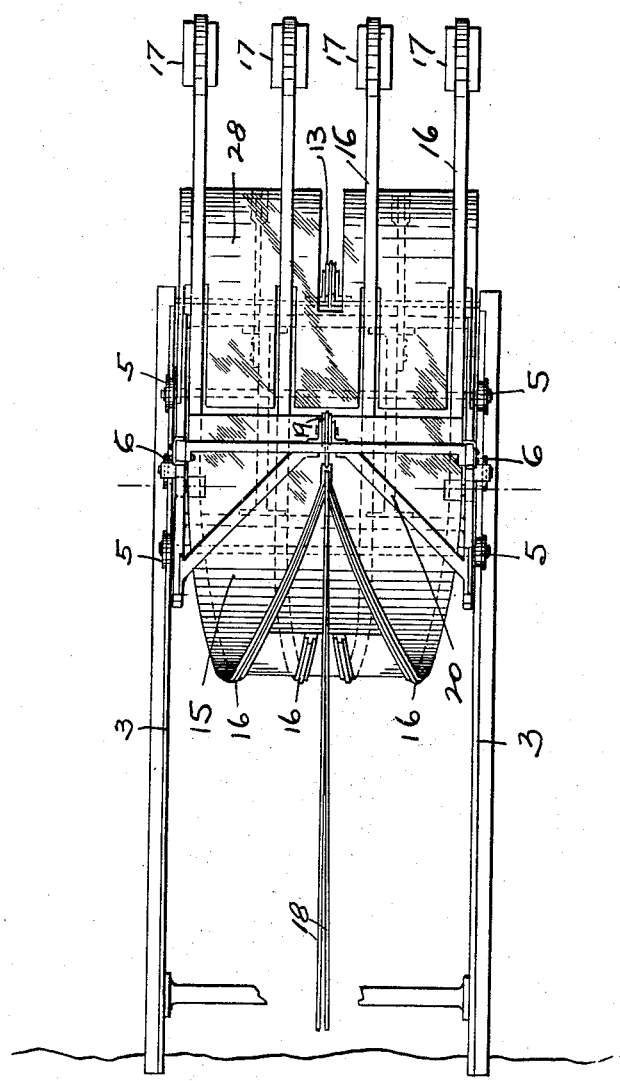
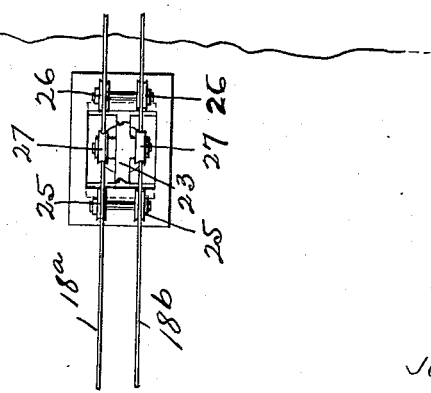
WITNESSES:
INVENTOR.
JOHN H. HENDERSON
BY Miller & White
HIS ATTORNEYS.

UNITED STATES PATENT OFFICE.

JOHN H. HENDERSON, OF EAST OAKLAND, CALIFORNIA.

WAVE-MOTOR.

1,126,999.   Specification of Letters Patent.   Patented Feb. 2, 1915.

Application filed January 6, 1914. Serial No. 810,537.

*To all whom it may concern:*

Be it known that I, JOHN H. HENDERSON, a citizen of the United States, and a resident of East Oakland, county of Alameda, and State of California, have invented certain new and useful Improvements in Wave-Motors, of which the following is a specification.

The object of the invention is to provide an apparatus for transforming the energy of waves and breakers into a form of energy which is available for use.

Another object of the invention is to provide an apparatus for transforming both the kinetic and potential energy of the waves and breakers.

A further object of the invention is to provide an apparatus which is movable so that the actuating part thereof may be maintained at the proper level to be most effectively operated upon by the waves and breakers.

The invention possesses other advantageous features, which, with the foregoing, will be set forth at length in the following description, where I shall outline in full that form of the invention which I have selected for illustration in the drawings accompanying and forming part of the present specification.

The novelty of the invention will be included in the claims succeeding said description. From this it will be apparent that I do not limit myself to the showing made by said drawings and description, as I may adopt many variations within the scope of my invention as set forth in said claims.

Referring to said drawings: Figure 1 is a side elevation of the apparatus arranged in the surf and connected to an energy transforming means installed on the shore, parts of the apparatus being broken away to reduce the size of the figure. Fig. 2 is a plan or top view of the wave motor and compensating apparatus, the connection between the two being broken away to reduce the size of the figure.

The invention comprises a pivoted bucket or vane which is arranged in the surf so that it is acted upon and moved by the waves or breakers and the motion thereof is transferred by suitable cables or connecting means to an apparatus arranged on the shore or beach above the tide line. The bucket or vane is mounted on a carriage so that it may be raised and lowered with changes in the tide, so that the bucket will lie at the proper elevation to be most efficiently acted on by the waves or breakers, and so that it may be raised above the breakers for the purposes of repair or adjustment. Compensating means are provided for maintaining the connecting cables taut, for the various positions of the carriage.

In the present disclosure of the invention, I have shown a structure erected on the submerged beach at a suitable distance from the shore, so that the bucket will lie in the most effective wave zone. The structure is made as open as is compatible with good engineering practice in order that it may withstand the battering effect of the breakers. The structure consists preferably of steel columns 2, suitably anchored and braced, and the upper ends of the columns terminate in an inclined plane, sloping upwardly shoreward. Arranged on the columns are the inclined rails 3 upon which is mounted the carriage 4. The carriage is provided with flanged or grooved rollers or wheels 5—6, which engage the upper and nether surfaces of the rail to prevent the dislodgment of the carriage therefrom. Attached to the forward end of the carriage 4 is a cable 7 which passes over a sheave 8 at the upper end of the inclined structure, extends shoreward, passing around the drum 9 and again seaward, passing over another sheave at the upper end of the structure, around the sheave 13 at the lower end of the structure and is attached to the rear end of the carriage. By rotating the drum 9, the carriage is moved along the track, and by virtue of the attachment of the connecting cable at each end, may be held in any desired position.

Pivotally mounted on the carriage by means of the shaft 14 is a curved bucket or vane 15, which is strengthened on its under surface by suitable steel bars 16. The bucket is arranged so that the greater portion of its surface lies to the shore side of the shaft 14 and the bucket is formed substantially parabolical in curvature, with the shore or upper end curved upward. As a breaker piles up on the bucket its shore end is depressed both by the weight of the water and the reaction thereof, due to the deflection of its direction by the bucket. The steel bars 16 project beyond the surface of the bucket at the front and rear edges, and to the rear projecting portions are attached the counterweights 17 which elevate the bucket after it has been depressed by a breaker.

The bars 16 extending beyond the front edge of the bucket project backwardly and converge and are secured together at their ends. Attached to the bars at this point is a cable 18, one side of which passes around a sheave 19 mounted on the frame 20 projecting above and secured to the carriage frame, and thence extends shoreward, and the other side of the cable extends directly shoreward. The cable passes around suitable pulleys and one end $18^a$ is attached to one end of the piston rod 21 of the air compressor 22, and the other end $18^b$ is attached to the opposite end of the piston rod. The air compressor is of the single acting type, operating to compress air on the down stroke of the tilting bucket.

Arranged between the compressor and the tilting bucket is a device for holding the cable taut, for various positions of the carriage. This device comprises a weighted cross head 23, slidable in the upright guides 24. The two portions of the cable 18 pass around sheaves 25 and 26 arranged at the upper ends of the guides and under sheaves 27 mounted on the cross head, and the cross head raises and lowers as the carriage is moved and holds the cables taut.

In order to increase the amount of water which piles up on the bucket and to cause small waves or breakers to cause a tilting of the bucket, I arrange a deflector plate or apron 28 at the lower end of the carriage. This apron is preferably inclined downwardly with respect to the carriage and terminates adjacent the lower end of the bucket and operates to deflect a greater amount of water into the bucket, thereby increasing the amount of power which may be derived by the apparatus.

I claim:

1. In a wave motor, an inclined track arranged in the surf, a carriage mounted on said track, means for moving said carriage, a bucket pivoted to said carriage and a deflecting plate on said carriage arranged to deflect the water onto said bucket.

2. In a wave motor, a carriage, a bucket pivoted to said carriage, and a deflecting plate on said carriage inclined downwardly at the outer end thereof.

3. In a wave motor, an inclined track arranged in the surf, a carriage mounted on said track, a curved bucket pivoted to said carriage, and a deflecting plate inclined downwardly with respect to said carriage arranged at the lower end thereof and terminating at its forward end adjacent said bucket.

In testimony whereof, I have hereunto set my hand at San Francisco, California, this 30th day of December 1913.

JOHN H. HENDERSON.

In presence of—
H. G. PROST,
A. MURPHY.